(12) United States Patent
Langhammer

(10) Patent No.: US 9,519,807 B1
(45) Date of Patent: Dec. 13, 2016

(54) HASH GENERATION CIRCUITRY AND METHODS FOR MULTI-CHANNEL, MULTI-LANE ENCRYPTION AND AUTHENTICATION

(71) Applicant: Altera Corporation, San Jose, CA (US)

(72) Inventor: Martin Langhammer, Salisbury (GB)

(73) Assignee: ALTERA CORPORATION, San Jose, CA (US)

( * ) Notice: Subject to any disclaimer, the term of this patent is extended or adjusted under 35 U.S.C. 154(b) by 0 days.

(21) Appl. No.: 14/513,519

(22) Filed: Oct. 14, 2014

(51) Int. Cl.
*G06F 11/30* (2006.01)
*G06F 21/72* (2013.01)

(52) U.S. Cl.
CPC .................. *G06F 21/72* (2013.01)

(58) Field of Classification Search
CPC ..................................... G06F 21/72
See application file for complete search history.

(56) References Cited

U.S. PATENT DOCUMENTS

| 2012/0172064 A1* | 7/2012 | Willey | H04W 68/025 |
| | | | 455/458 |
| 2013/0254119 A1* | 9/2013 | Hayhow | G06Q 20/3829 |
| | | | 705/71 |

OTHER PUBLICATIONS

Henzen, L. et al., "FPGA Parallel-Pipelined AES-GCM Core for 100G Ethernet Applications," *IEEE 2010 Proceedings of ESSCIRC*, Seville, Spain, pp. 202-205 (Sep. 14-16, 2010).

* cited by examiner

*Primary Examiner* — Esther B Henderson

(57) ABSTRACT

Encryption/authentication circuitry includes an authentication portion operating on a plurality of lanes of encrypted data spanning a number of channels, and including hash constant storage for a predetermined maximum number of channels, and partial hash selection circuitry for determining, for each respective lane, a respective hash index into the hash constant storage. Wind-down mode detection circuitry also is described, as well as a method of operating such circuitry also is provided.

24 Claims, 17 Drawing Sheets

FIG. 1

| Lane 1 | Lane 2 | Lane 3 | Lane 4 |
|---|---|---|---|
| 1 | 2 | 3 | 4 |
| 5 | 6 | 7 | 8 |
| 9 | 10 | 1 | 2 |
| 3 | 4 | 5 | 6 |
| 7 | 8 | 9 | 10 |
| 1 | 2 | 3 | 4 |
| 5 | 6 | 7 | 8 |

| Lane 1 | Lane 2 | Lane 3 |
|---|---|---|
| 1 | 2 | 3 |
| 4 | 5 | 6 |
| 7 | 8 | 9 |
| 10 | 1 | 2 |
| 3 | 4 | 5 |
| 6 | 7 | 8 |
| 9 | 10 | 1 |
| 2 | 3 | 4 |
| 5 | 6 | 7 |
| 8 | 9 | 10 |

| Lane 1 | Lane 2 |
|---|---|
| 1 | 2 |
| 3 | 4 |
| 5 | 6 |
| 7 | 8 |
| 9 | 10 |
| 1 | 2 |
| 3 | 4 |
| 5 | 6 |
| 7 | 8 |
| 9 | 10 |

FIG. 2

| Lane 1 | Lane 2 | Lane 3 |
|---|---|---|
| 1 | 2 | 3 |
| 4 | 5 | 6 |
| 7 | 8 | 9 |
| 10 | 3 | 2 |
| 1 | 6 | 5 |
| 4 | 9 | 8 |
| 7 | 10 | 3 |
| 2 | 1 | 6 |
| 5 | 4 | 8 |
| 7 | 9 | 10 |

| Lane 1 | Lane 2 |
|---|---|
| 1 | 2 |
| 3 | 4 |
| 5 | 6 |
| 1 | 2 |
| 3 | 4 |
| 7 | 8 |
| 9 | 10 |
| 5 | 6 |
| 7 | 8 |
| 9 | 10 |

HASH GENERATION CIRCUITRY AND METHODS FOR MULTI-CHANNEL, MULTI-LANE ENCRYPTION AND AUTHENTICATION

FIELD OF THE INVENTION

This invention relates to circuitry and methods for hash generation in multi-channel, multi-lane encryption and authentication of an arbitrary number of channels within a fixed number of lanes.

BACKGROUND OF THE INVENTION

Building encryption circuitry for a known encryption application is easy. If the number of channels to be encrypted and authenticated, and the data rate of each channel, are known, an appropriate number of lanes of encryption circuitry can be provided. There could be one lane per channel, or if the data rate is higher than the speed of the device, there could be a correspondingly higher number of lanes per channel.

However, if the encryption and authentication circuitry is being built for an unknown encryption application—whether as a fixed multi-purpose encryption and authentication circuit or as part of a programmable integrated circuit device such as a field-programmable gate array (FPGA) or other programmable logic device (PLD)—then the problem becomes more difficult. Whatever number of lanes may be provided may not easily map to the particular application that a user may attempt to implement.

In one application, a user may need fewer channels than there are lanes. If the data rate is lower than the device speed, that application is trivial; each channel could be encrypted in one lane. But once the number of channels exceeds the number of lanes, or if the data rate exceeds the device speed so that more than one lane is needed per channel, complications can arise.

For example, if there are three lanes and four channels, the four channels will have to be multiplexed onto the three lanes (e.g., by time-division multiplexing). That in itself is not difficult. However, the different channels may have different encryption keys and different hash keys, and even for a given channel the encryption key or hash key may change over time. In such a case, for any time slice, the correct key for the correct channel will have to be delivered to the appropriate lane.

Similarly, it may be necessary to divide each channel among multiple lanes because the data rate exceeds the device speed. If so, the same problem of delivering the correct key or hash to the correct lane at the correct time will arise. In addition, depending on the number of channels and the number of lanes, the actual encryption or authentication operations may not be able to complete within the number of clock cycles between appearances of a particular channel in a particular lane.

SUMMARY OF THE INVENTION

In accordance with embodiments of the present invention, multi-lane encryption and authentication circuitry may be added to an integrated circuit device. The circuitry may have a fixed size, including a certain number of lanes and a number of stages per lane, and provision for a certain maximum number of channels (although not all channels provided for would necessarily have to be used).

The circuitry could include both an encryption portion and an authentication portion. In the encryption portion, there would be certain number of stages to support a certain encryption key size. For example, ten stages may be needed to support an encryption key size of 128 bits, while fourteen stages may be needed to support an encryption key size of 256 bits. At each stage, the encryption key for each channel would be kept in synchronization with the data for that channel, and there would be an encryption key available at each stage for each channel. Each lane would be able to select the encryption key for the channel that it is operating on.

Similarly, in the authentication portion, a partial hash state would be calculated for whatever channels are being worked on in the various pipes at a given time. A partial hash state is the current state of the calculation of the final hash state, updated using the last text value. In some cases, there will be multiple partial hash states valid at any time. All partial hash states, whether one or many, may be combined once text input has completed, to create the final hash state. The partial hash states would be accumulated on a per channel basis, so that, by the end of the process, complete hash state values for each channel are available. This requires keeping track of which track the hash values are currently being calculated for, as in the case of the encryption keys. But in addition, if the number of clocks between occurrences of a particular channel is too small, multiple partial hash states would have to be calculated for each channel, and those also would have to be kept track of.

Therefore, in accordance with embodiments of the present invention there is provided encryption/authentication circuitry including an authentication portion operating on at least one lane of encrypted data spanning a number of channels, and including hash constant storage for a predetermined maximum number of channels, and partial hash selection circuitry for determining, for each respective lane, a respective hash index into the hash constant storage. Wind-down mode detection circuitry also is provided, where wind-down is a multi-step process that combines multiple partial hashes into a final hash as described below.

A method of operating such circuitry also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 1 shows examples of the distribution of a plurality of channels across different numbers of processing lanes;

FIG. 2 shows further examples of the distribution of a plurality of channels across different numbers of processing lanes;

DETAILED DESCRIPTION OF THE INVENTION

Figure 3:
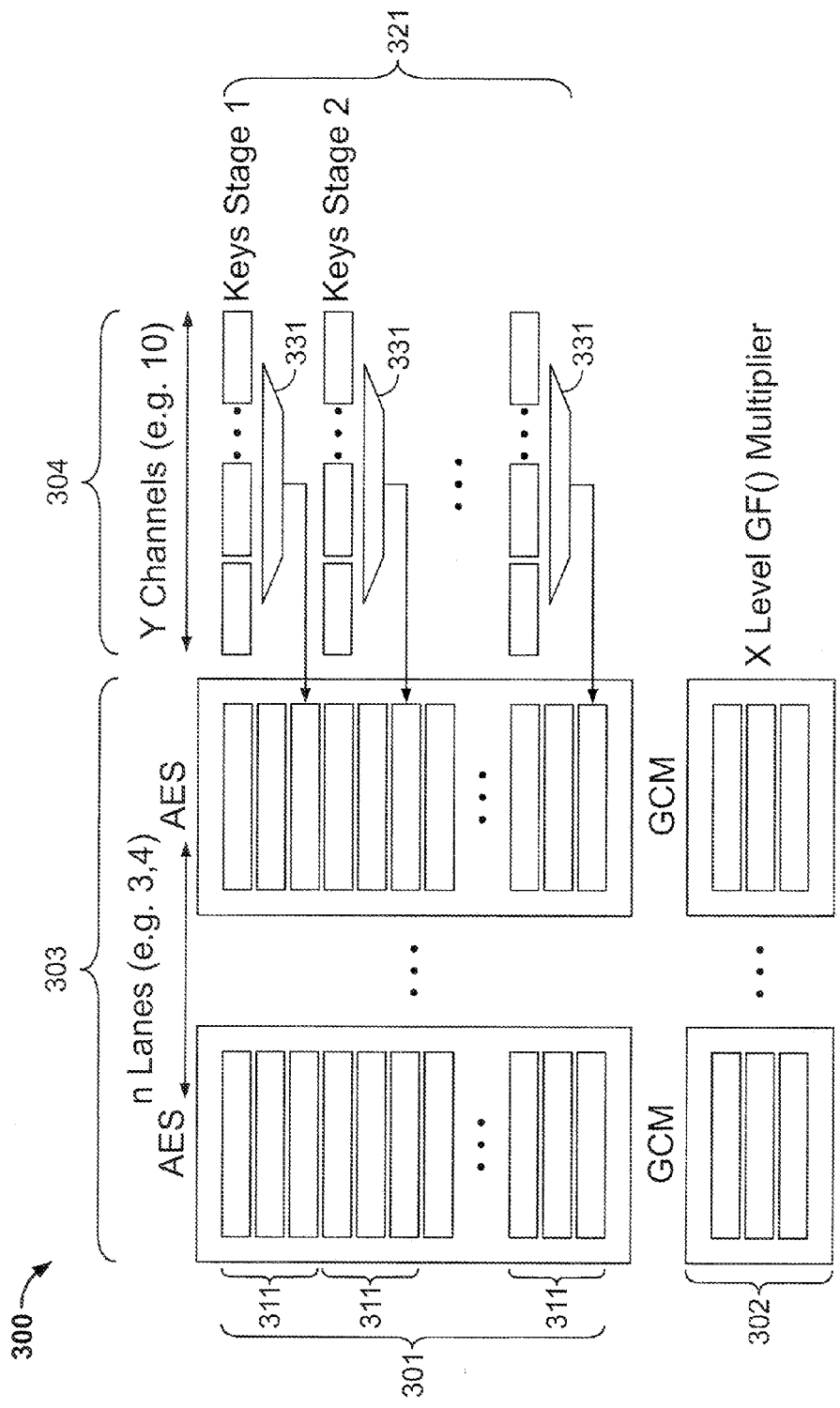
FIG. 3 shows top level architecture of encryption/authentication circuitry according to an embodiment of the invention.

Encryption and authentication circuitry may be optimized to support a set of encryption and authentication protocols with a fixed number of channels. If implemented in a programmable integrated circuit device, the number of channels may be selectable, but once the configuration is instantiated, the maximum number of channels would be fixed (even once instantiated, the circuitry may be used to operate on fewer than the instantiated maximum number of channels). The described architecture includes multiple lanes each capable of performing the desired encryption protocol. Again, when implemented in a programmable integrated circuit device, the number of lanes may be selectable, but once the configuration is instantiated, the number of lanes would be fixed. The encryption and authentication portions of the circuit can have different numbers of lanes.

The plurality of lanes can support a plurality of channels, but the number of channels may be independent of the number of lanes, and it is not necessary for the number of channels to be an integer multiple of the number of lanes or vice-versa. That can present a bookkeeping challenge, as will be described below, which is solved in accordance with embodiments of this invention.

Although in one example, the encryption protocol may be AES (Advanced Encryption Standard) and the authentication protocol may be GCM (Galois/Counter Mode), any encryption-authentication protocol pair may be used, as long as they are compatible with each other. In AESGCM, the encryption is counter mode, where a changing value (increasing by 1 per encryption operation per lane) is encrypted and then Exclusive-ORed with the data, which is then input to the authentication circuitry. In AESGCM, the counter value may be initialized using AES encryption, or directly from an initialization vector. The hash state or states may be initialized using additional data that does not form part of the ciphertext. The final hash state may be post-processed to create a tag value. Although the discussion that follows focuses on AESGCM, it will be apparent to one of skill in the art how to apply the disclosed principles to other encryption/authentication protocol combinations.

The use of multiple lanes helps increase the throughput of the circuitry. For example, with ten channels, each operating at about 10 Gbps, a total throughput of about 100 Gbps would be possible, even if the speed of the device would not inherently support such throughput. In the description that follows, three or four lanes are described, but as little as two, or many more, could be used, depending on the device speed. If the device speed is about 25 GHz-30 GHz, that would allow 100 Gbps operation of the encryption circuitry with three or four lanes.

Each lane may implement the encryption process in unrolled form, with each round in a separate stage. There may be pipelining between each stage, and any amount of pipelining inside each stage. The level of pipelining is selected to support the required system speed, and is independent of the number of channels that need to be supported. There is separate keyspace circuitry for each stage. As described in more detail below, all of the channel keyspaces may be precalculated and stored individually in staging registers, but the keyspace will change from clock cycle to clock cycle to correspond with the channel being processed at each stage of each line at a particular time. The number of rounds, or stages, can be, e.g., ten for 128-bit keys or fourteen for 256-bit keys.

The difficulties that are overcome by embodiments of this invention may be illustrated in FIGS. 1 and 2. The channel number and its associated text or data are loaded into each lane. The channel number is staged in lockstep with the processing lane, and used to select which key is used at which stage (see below). The simplest valid channel input sequences for the example of ten channels, with either two, three or four lanes, are shown in FIG. 1. Each of these mappings is a linear increase from lane to lane and then clock to clock, modulo the total number of channels. FIG. 2 shows some more complex sequences, which recognize that some channels may be skipped in a particular sequence because there are no data on them to be processed in a particular clock cycle.

As seen in both FIG. 1 and FIG. 2, each channel may be mapped to a different lane from one occurrence of that channel to the next occurrence of that channel. In the two-lane example in FIG. 1, where each channel appears in each sequence, the odd-numbered channels are always in one lane and the even-numbered channels are always in the other lane. While that is also the case in the two-lane example in FIG. 2, it may not always be the case in a two-lane example, because it depends on which channels are skipped in a particular sequence.

It will be apparent from FIGS. 1 and 2 that while the provision of additional lanes increases the throughput, it also reduces the number of clock cycles between appearances of a channel, which therefore reduces the amount of time available to process each channel. For example, in FIG. 1, there are five clocks between each occurrence of each channel in the two-lane example, but in the four-lane example, there are only two clocks between each occurrence of each channel. This may particularly affect the authentication portion, as discussed below.

FIG. 3 shows the top level architecture of an embodiment of encryption/authentication circuitry 300, with encryption portion 301 and authentication portion 302. As shown, the number of lanes 303 is the same in both encryption portion 301 and authentication portion 302, although that is not necessary.

Encryption portion 301 also includes a precalculated keyspace 321 for each round or stage 311, with a plurality of key lanes 304 in parallel with the parallel encryption lanes 303. The number of key lanes 304 equals the maximum number of channels that can be processed (remember that the circuitry is built for some maximum number of channels but the actual number of channels used may be less than that maximum number; the remainder of this discussion assumes that the maximum number of channels is in use). In this drawing, three to four encryption lanes per round are shown for the purpose of illustration.

A set of multiplexers 331 at each stage 311 allows each encryption lane 303 to select the appropriate key, from the keyspace 321 at that stage 311, corresponding to the channel currently in that encryption lane 303 at that stage 311. During operation, the text or data for each channel are loaded into each lane 303. Because, as noted above, the channels will likely be mapped to a different lane 303 from one input of that channel to the next input of that channel, the channel number is staged, through registers 401 (FIG. 4), in lock step with the processing lane 303, and used to select which key is used at which stage.

Figure 4:
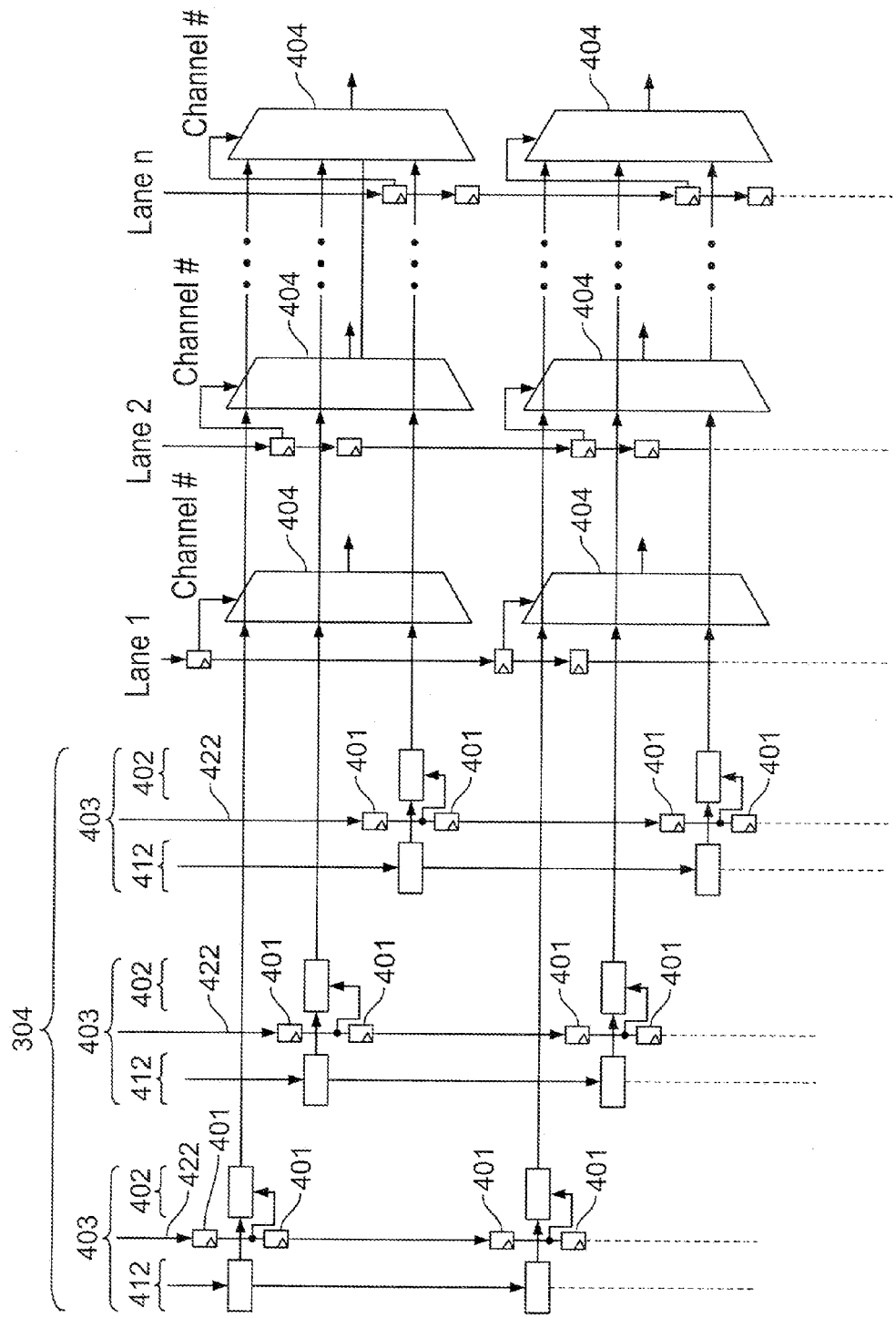
FIG. 4 shows an implementation of key selection circuitry according to an embodiment of the invention.

The details of the key selection are shown in FIG. 4 for two stages 311. For each stage 311, the keyspace 321 has Y working key registers 402 and Y staged key registers 412, where Y is the maximum number of channels (it is possible that fewer than all available channels will be used). The functions of staged key registers 412 will be described below.

The current encryption keys will be in working key registers 402. As noted above, the channel number is staged, through registers 401, which are arranged in channel number lanes 403, in lock step with the processing lanes 303. For each particular processing lane 303, the channel number in the corresponding channel number lane 403 causes a corresponding one of multiplexers 404 to select from working key registers 402 the encryption key for the correct channel for that processing lane 303.

Although the keyspace is shown in FIG. 4 only for encryption keys in encryption portion 301, a similar arrangement will be provided for the authentication keys in authentication portion 302.

It is likely that each channel will have its own keyspace, although some channels may share encryption keys. It is possible that some channels may share the same encryption key, but have different authentication keys, and generation different authentication values, or tags as they are commonly called.

The encryption keys may be calculated contemporaneously, in which case they can be loaded directly into working key registers 402. However, in such a case, a channel cannot be used while its associated key is being calculated. Alternatively, the encryption keys can be precalculated and loaded into key staging registers 412. Each staging register 412 can be loaded with the next key for a channel register while that channel is being used. A switch key signal 422 is generated at the top of each lane as the AND of a "start of packet" signal and the channel number corresponding to that encryption key. The switch key signal is pipelined by the number of stages, but the entire switch key pipeline is advanced by one clock cycle with respect to the data pipeline. This allows the staged key to be switched to the working key register exactly when it is first needed, but still allowing an encryption operation for the same channel for an earlier packet with a different key to complete correctly.

The authentication stage is similar in some respects in that there are multiple lanes and different channels may appear in different lanes from time to time.

A number of values, including hash key values H, are initialized for the authentication step.

In one implementation, a separate iterative encryption circuit or module (this may be an additional occurrence of the encryption circuitry used in connection with the keyspace, as described above) is used to generate all the values, which are then stored in staging registers (a separate set of registers is used for each channel). Alternatively, the main encryption engine can be used to calculate the H values, utilizing empty slots in one or more channels (this can be deterministic or opportunistic, depending on the way the system works), or by dedicating one channel just for initialization of values. A Galois-field multiplier in the authentication circuitry also can be used this way to calculate the H values, either by using empty issue slots, or by dedicating a slot to specifically for H value calculations.

For example, if an encryption lane 303 is used to calculate the H value and AESGCM encryption/authentication is being used), H=AES(K,0)—i.e., the AES encryption of a plaintext containing 0 with the key used for the hash. In the case of AESGCM, the key K is used for both encrypting the plaintext and generating H. Once a valid key K is in registers 422, encrypting a 0 input before starting the plaintext encryption will generate a valid H for that channel.

The calculated H values may be loaded from staged registers into working registers when a new packet is started for the channel it is associated with, as described above in connection with the keyspace (see FIG. 4). Depending on the level of pipelining in the authentication stage (specifically in the Galois-field multiplier in the case of GCM authentication), and taking into account the number of channels and the number of clocks between inputs for the same channel, multiple powers of H may be required (as described in more detail below). The higher powers of H also can be calculated ahead of time, either using by a separate Galois-field multiplier, or by using serial multipliers to save logic (because the initialization of channel values can be done ahead of time independently of the channel operation). A case using H, as well as a case using both H and $H^2$, are described below.

Figure 5:
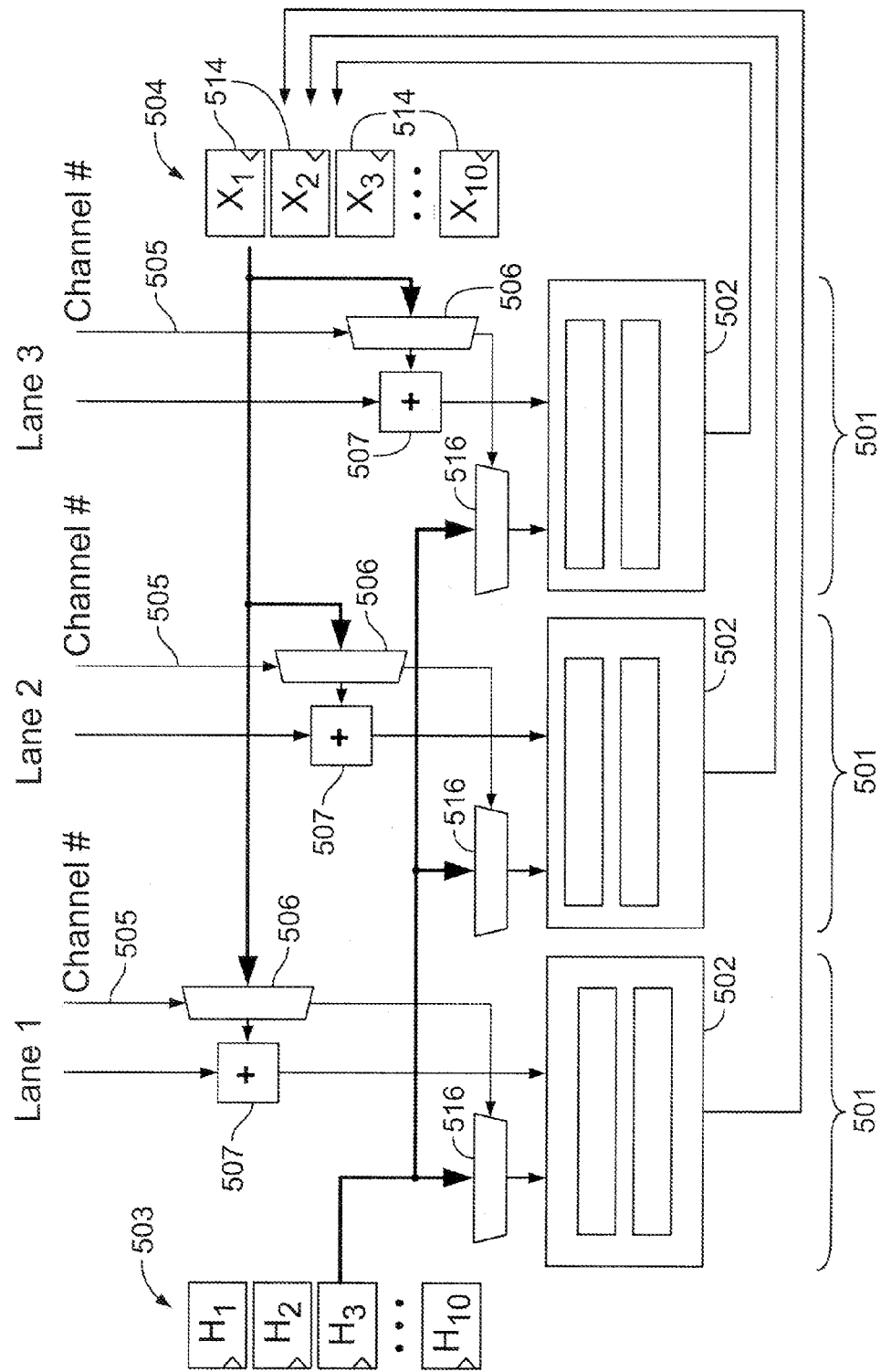
FIG. 5 shows a first implementation of authentication circuitry according to an embodiment of the invention.

FIG. 5 shows the authentication stage 500 in a three-lane, ten-channel system (it is not necessary for the number of lanes in the authentication stage to be the same as the number of lanes in the encryption stage; however, by definition, the number of channels is the same in both stages). In this example, there is one Galois-field multiplier 502 in each lane 501, with each multiplier 502 each fed by two pipelines 503, 504. Pipeline 503 on the left side of the drawing is loaded with ten H values (one for each channel), and pipeline 504 on the right side of the drawing contains ten X values (current hash states for each channel). The channel numbers 505, piped in as described above in connection with the encryption stage, control multiplexers 506, 516 which select the appropriate values of H and X, respectively, for each multiplier 502. On every clock cycle containing valid text output data for one of the encryption lanes 303, the text is summed at 507 with the current hash state (X) for that channel, and then multiplied by the H value for that channel. The result is written back to the same X register 514, so that registers 514 accumulate the current hash states.

Thus, as in the case of the encryption stage, it is not necessary in the authentication stage for any particular channel to appear in any particular lane, as long as the channel number is staged in lockstep with the data being processed. However, the arrangement of FIG. 5 assumes that a sufficient number of clock cycles between inputs of a particular channel to compute a hash state by direct application of Horner's rule:

Hash State=$((((((X_5H+X_4)H+X_3)H+X_2)H+X_1)H+X_0)$

For example, as seen in the two-pipe and three-pipe cases in FIG. 2, the number of clocks between inputs of a particular channel is at least 3 and as many as 5. This is sufficient for the 3-clock round trip arrangement shown in FIG. 5 (one clock for each addition and two clocks for each multiplication).

However, if the amount of pipelining is greater than the number of clocks between any two inputs of the same channel, additional powers of H may be needed to calculate the hash state. In the case where the round-trip delay is one clock longer than the time between the two inputs, two partial hash states must be calculated, which are then combined to make the final hash state:

Hash State=$(((X_5H^2+X_3)H^2+X_1)H^2+(((X_4H^2+X)H^2+X_0)H$

The channel tag can be generated anytime after the packet being processed has been completed, including during processing of the next packet on that channel. The end packet signal for that channel starts a completion sequence for the hash state, which is stored in a hash state hold register (not shown), added to the packet length. If the hash state for a channel is updated a maximum of less often than the round-trip delay, the final hash state is the same as the partial hash state. If the hash state for a channel is updated a maximum of twice during a round-trip delay, the final hash state is the higher index pre-tag (which will have been calculated by multiplying by $H^2$) added to the current calculation (which will be calculated by multiplying by H instead of by $H^2$). If the gap between two channel inputs is more frequent, a more complex partial hash state calculation and completion sequence is used, as described below.

Each generated value (including H and any powers of H) has a valid signal output. When a value is generated, a valid signal is asserted when the value is written to its staging register. When the next packet for the channel associated with that value is started, the staging register is transferred to the working register, and the valid signal is de-asserted. The value remains in the staging register, so the same value will be used for the next packet if a new one is not generated. The valid signal therefore also as an available signal—when the valid signal is asserted, a value is in the staging register which has not been used yet. When the valid signal is low, the staging register is either empty, or contains a value which has already been used, so it is safe to overwrite the contents of the staging register.

Figure 6:
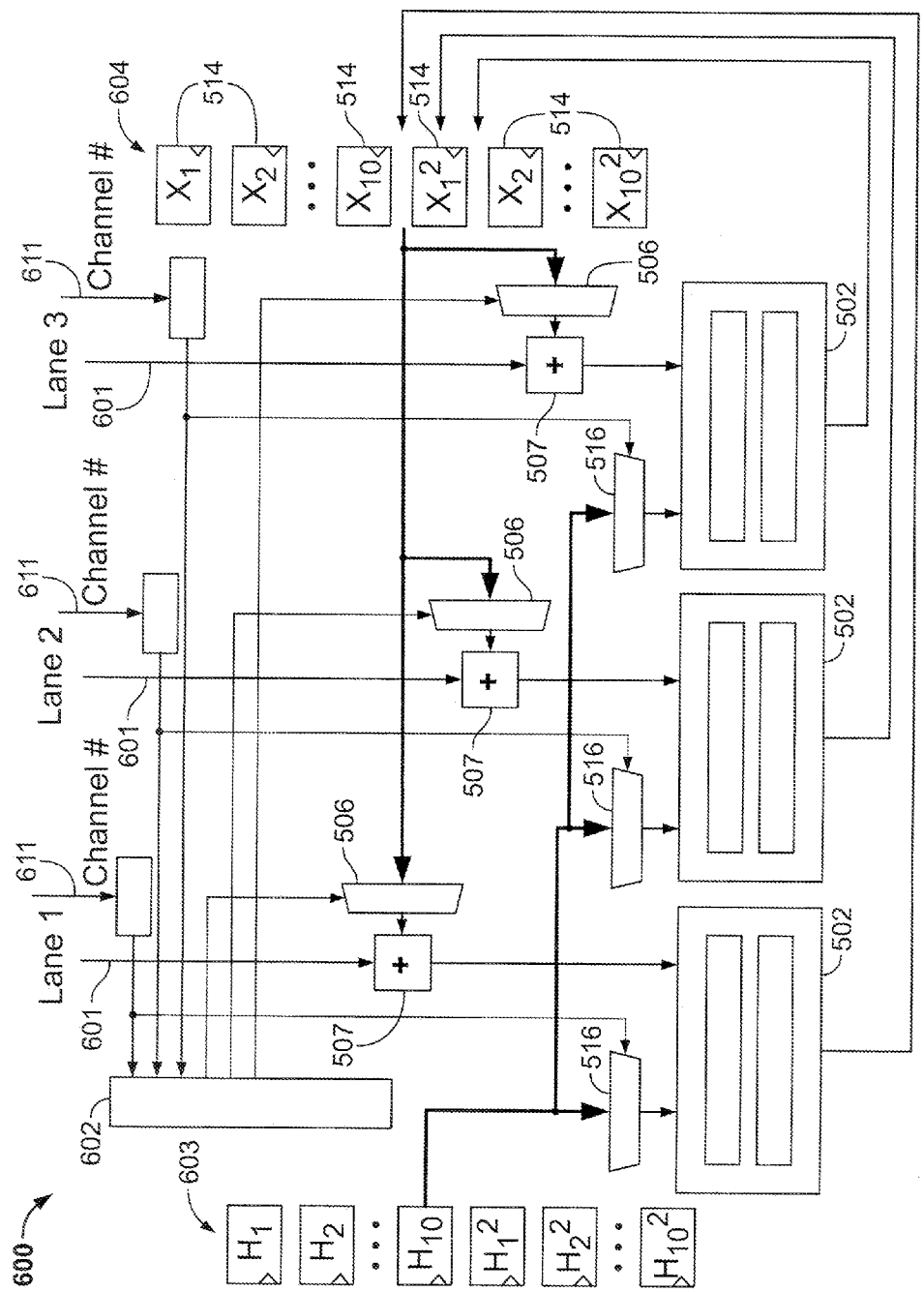
FIG. 6 shows another implementation of authentication circuitry according to an embodiment of the invention.

FIG. 6 shows the case of a more deeply pipelined authentication circuit 600. The next power of H is provided for each hash state, as well as odd and even partial hash states. The powers of H are stored in register bank 603. This circuit can be used for any number of lanes, depending on the relationship on gaps between inputs and the round-trip latency in the authentication circuit. For example, the 2-lane system of FIG. 2, where there are five clocks between occurrences of a particular channel, could use circuit 600 if the round-trip latency were six clocks.

Each encryption lane output 601 has a channel number 611 associated with it. The channel number is input to control circuit 602 which keeps track of which partial hash state (even, stored in $X_n$, or odd, stored in $X^2_n$) is current for that channel, and updates it, so that the other partial hash state (odd or even, respectively) will be used the next time that channel output is received from any encryption lane. The partial hash states are stored in register bank 604.

$H^2$ is used for every update of the partial hash state values, except for the last update of the even partial hash state, where H is used. Otherwise, the multiplexer pattern for multiplexing H into each multiplier may decoded directly from a binary to one-hot multiplex encoder for each multiplier lane.

If there are more than two hash updates per channel request within one round-trip length, the circuitry can optionally apply back pressure (e.g., stop that encryption lane by outputting a "busy" indication or "stall" signal back to the encryption circuitry) until the congestion is cleared (i.e., one of the hash updates in the channel has been written back to the partial hash state registers).

Alternatively, the faster and more complex partial hash state calculation and completion sequence referred to above may be used, as described in more detail below.

Figure 7:
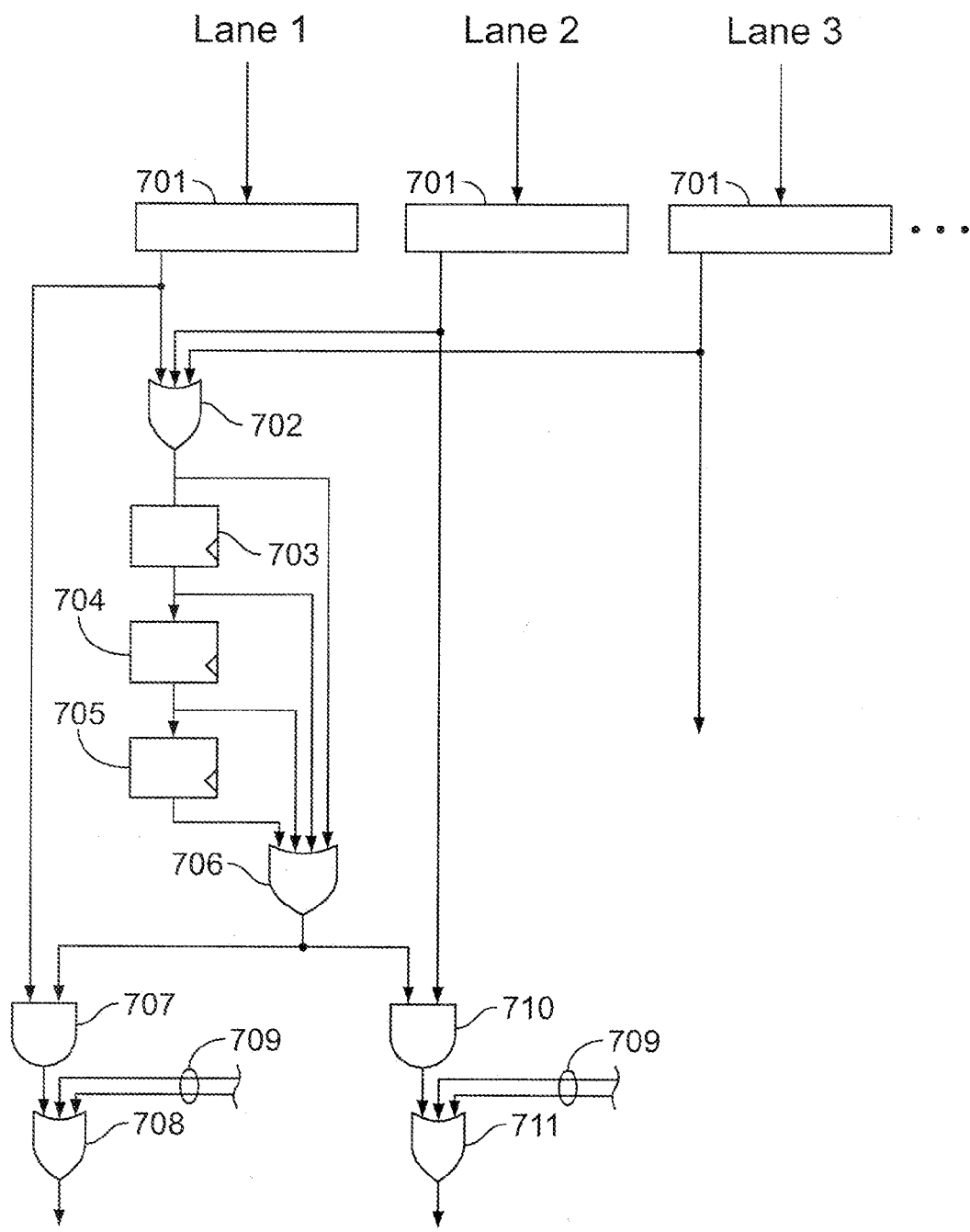
FIG. 7 shows an implementation of stall signal circuitry according to an embodiment of the invention.

One implementation for generating a stall signal may be described with reference to FIG. 7. One-hot, or unary, encoder 701 in each encryption lane 700 generates a unary signal to indicate which channel is on the output of that encryption lane 700. Encoder 701 is replicated for each lane 700. All bits for a given channel across all lanes are ORed together by OR gate 702. This will indicate if a particular channel is active anywhere at the input of the authentication block. This signal is delayed by the roundtrip delay of the authentication operation, in this case three cycles, by providing registers 703, 704, 705 (which may be programmably incorporated based on the particular implementation of the overall system). If any authentication operation has been issued for a particular channel for any lane during the round trip delay (i.e., an authentication operation is still in progress), OR gate 706 will output a '1'. That signal is then ANDed at 707 with the channel indication from encoder 701 for that lane. Although this arrangement is drawn for one channel in one lane, every channel will have an individual back-pressure indication (output of 707) for each respective lane. All channel back-pressure indications for that lane (indications from other channels are indicated at 709) are ORed in OR gate 708 to create a lane back-pressure signal, which can be used to halt the lane operation until the hash has cleared. The entire pipe for the affected lane is halted, not just the conflicting channel. This circuitry may be replicated across all lanes. In this example, gates 710 and 711 provide the back-pressure signal for the next lane.

Figure 8:
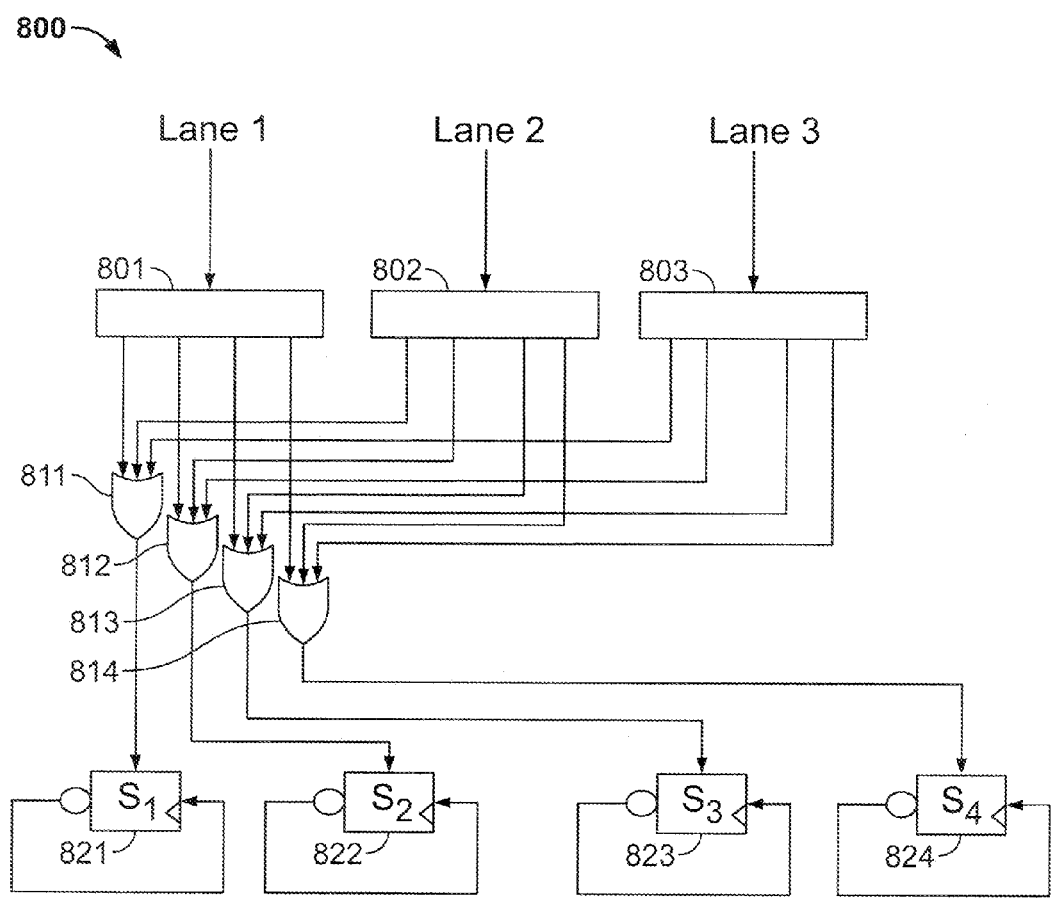
FIG. 8 shows an implementation of channel-tracking circuitry according to an embodiment of the invention.

FIG. 8 shows how the current partial hash (odd or even) is tracked for each channel by circuitry 800. This example has three encryption lanes and a total of four channels. Each lane output has a channel number associated with it. This circuit assumes that only one encryption per channel can be issued per clock cycle, although another encryption for that channel can follow on the next clock cycle. The channel number in each lane is converted at 801, 802, 803 to a one-hot value, and all bits for any channel are ORed together. This will create a '1' on the output of the OR-gate 811, 812, 813, 814 for that channel if the channel appears in any lane, which will enable the indicator register s1-s4 (821-824) for that channel. The register will then flip state.

Figure 9:
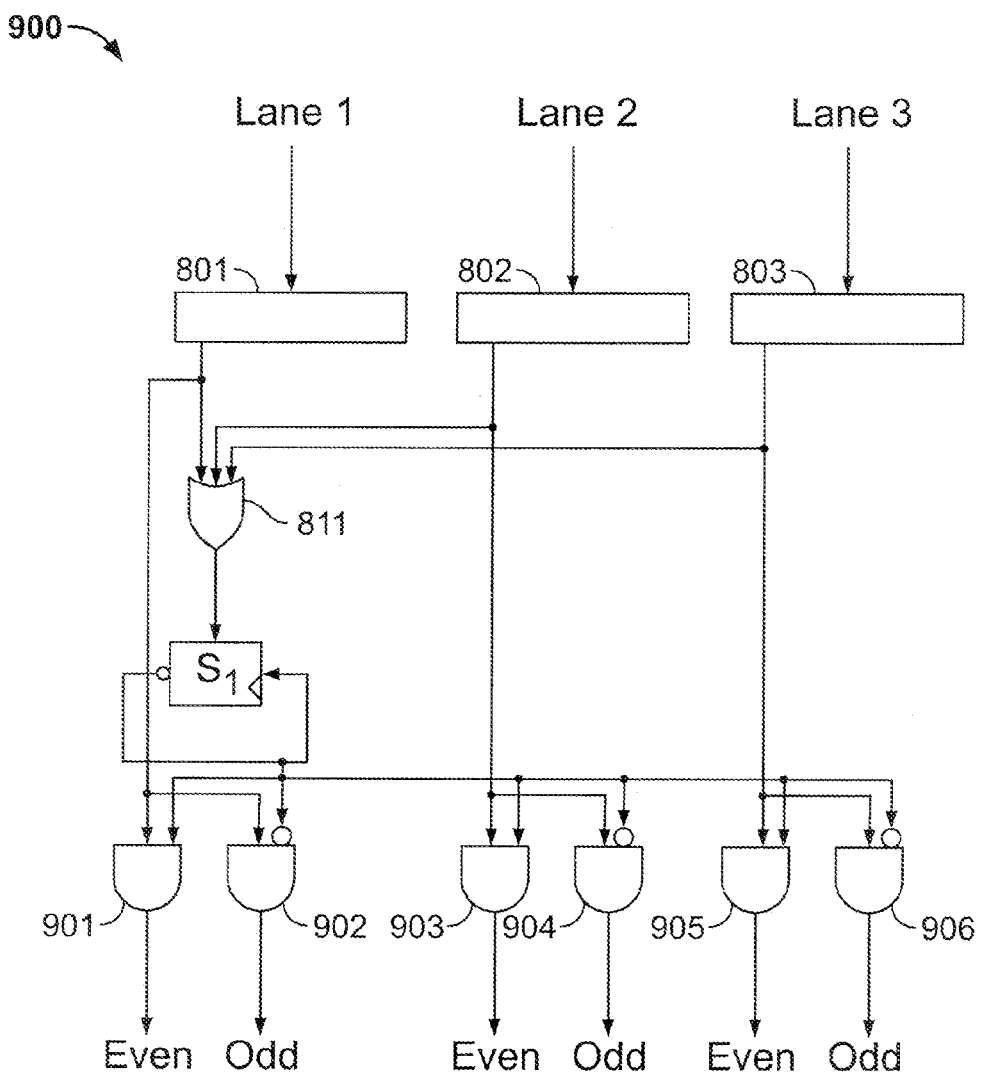
FIG. 9 shows an implementation of partial-hash selection circuitry according to an embodiment of the invention.

FIG. 9 shows how the registers s1-s4 (821-824) are used to select the even or odd partial hash. Circuitry 900 is shown for channel 1 only, to avoid crowding the drawing, but circuitry 900 is replicated for each channel. The one-hot functions 801, 802, 803 are the same as in FIG. 8 and operate on a per-lane basis. The resulting one-hot selection bit is input to all AND-gates 901-906. The state of indicator register 821 is input to AND-gates 901, 903, 905. The inverse of the state of indicator register 821 is input to AND-gates 902, 904, 906. If the resulting one-hot selection bit for lane 1 selects channel 1, then in lane 1, the even partial hash state is selected if the indicator register $S_i$ (821) is high, and the odd partial hash state is selected if the indicator register $s_1$ (821) is low. Similarly, if the resulting one-hot selection bit for lane 2 selects channel 1, the even partial hash state is selected if the indicator register $s_1$ (821) is high, and the odd partial hash state is selected if the indicator register $s_1$ (821) is low. The same would be true in all lanes for channel 2, and for channel 3, etc. Thus all lanes, no matter how many, can use a single indicator register sn.

Figure 10:
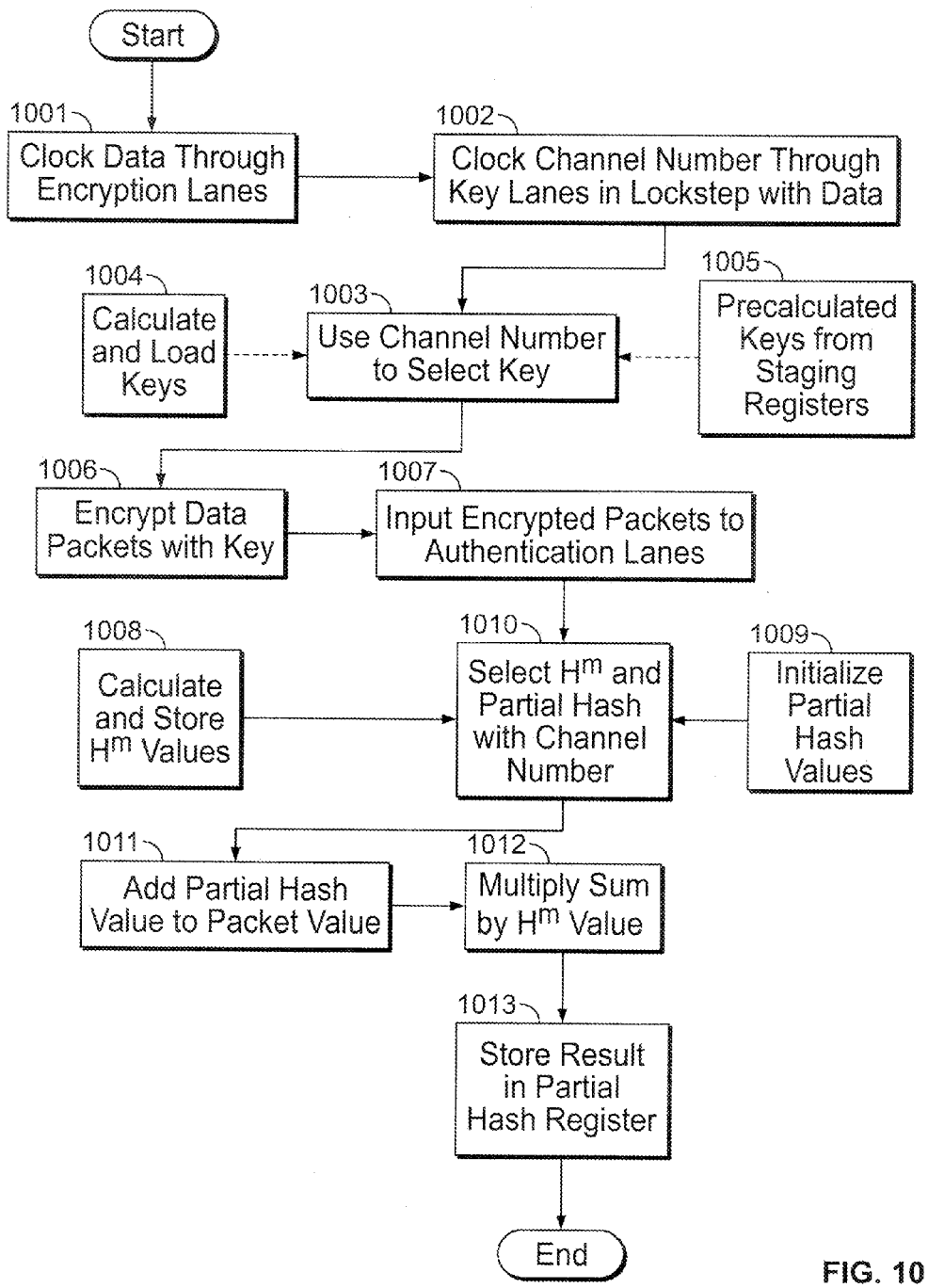
FIG. 10 is a flow diagram of a method according to an embodiment of the present invention for operating a device incorporating the present invention to perform authentication and encryption.

Encryption/authentication circuitry 300, as described above, may be operated to perform encryption and authentication of an arbitrary number of channels as follows (see FIG. 10):

Packets of data to be encrypted are clocked through encryption lanes 303 (as at 1001). At the same time, the channel number for the data in each packet is clocked in lockstep through key lanes 304 (as at 1002). The channel numbers in key lanes 304 select the appropriate key (as at 1003) from the appropriate working key register 402 (which will have been loaded directly upon calculation as at 1004, or from precalculated keys in staged key registers 412 based on switch key signal 422 as at 1005). Encryption lanes 303 operate on the data packets using the selected key (as at 1006).

The resulting encrypted packets, identified by channel, are then input (as at 1007) to the authentication lanes, which may be the same or different in number than encryption lanes 303. H values, and $H^2$ values if needed, will have been calculated and stored in registers 503/603, as at 1008), while the partial hash states are initialized in registers 514 (as at 1009). The channel number for each packet in each authentication lane will be used, as at 1010, to select the appropriate $H^m$ value and the appropriate partial hash state. The partial hash state will be added at 507 (as at 1011) to the value in the packet, which will then be finite-field-multiplied at 502 (as at 1012) by the selected $H^m$ value, and stored back into the appropriate partial hash state register 514 (as at 1013).

As described above, if there are more than two hash state updates per channel request within one round-trip length, the circuitry can optionally apply back pressure (e.g., stop that encryption lane by outputting a "busy" indication or "stall" signal back to the encryption circuitry until the congestion is cleared (i.e., one of the hash updates in the channel has been written back to the partial hash state registers). Alternatively, as noted above, a faster and more complex partial hash state calculation and completion sequence may be used. Such a calculation may be understood as follows:

As previously noted, the hash state for an algorithm such as AESGCM can be calculated by Horner's rule. The value H is a constant calculated for any given hash calculation, and the X values are the current encrypted words:

$$\text{Hash State} = (((((((((((H+X_{11})H+X_{10})H+X_9)H+X_8)H+X_7)H+X_6)H+X_5)H+X_5)H+X_4)H+X_3)H+X_2)H+X_1)H+X_0)$$

For high speed applications, the calculation can be parallelized. Multiple parallel streams can be used, as long as the modulo spacing for each stream is maintained separately. In the equation below, the $\{11^{th}, 7^{th}, \text{and } 3^{rd}\}$ words are in one group, the $\{10^{th}, 6^{th}, \text{and } 2^{nd}\}$ words are in another group, and so on. As can be seen from the equation, all words are multiplied by the highest power of H, until the final partial hash state is calculated, at which point each word group is multiplied by successive decreasing powers of H:

$$\text{Hash State} = ((X_{11}H^4+X_7)H^4+X_3)H^3+((X_{10}H^4+X_6)H^4+X_2)H^2+((X_9H^4+X_5)H^4+X_1)H+((X_8H^4+X_4)H^4+X_0)$$

In addition, in order to increase the speed of processing, the finite field multiplications (or other parts of this calculation) can be pipelined. The finite field multiplications are usually on very large fields (128 bits in the case of AESGCM encryption/authentication), which have a very deep logic structure. As can be seen from inspection of the equation, the previous multiplication needs to be complete before the addition of the next input and subsequent multiplication. If the multiplier is pipelined, the result may not be available for several clock cycles, and the same decomposition can be used over time.

For the example, the inputs are received in the following order: $11^{th}, 10^{th}, 9^{th}, 8^{th}$, and so on, but the grouping is again the $\{11^{th}, 7^{th}, \text{and } 3^{rd}\}$ words, the $\{10^{th}, 6^{th}, \text{and } 2^{nd}\}$ words, and so on. In this case there are four groups, which implies a pipeline depth of 4:

$$\text{Hash State} = ((X_{11}H^4+X_7)H^4+X_3)H^3+((X_{10}H^4+X_6)H^4+X_2)H^2+((X_9H^4+X_5)H^4+X_1)H+((X_8H^4+X_4)H^4+X_0)$$

If the pipeline depth is 3, for example, then there would be three groups:

$$\text{Hash State} = (((X_{11}H^3+X_8)H^3+X_5)H^3+X_2)H^2+(((X_{10}H^3+X_7)H^3+X_4)H^3+X_1)H+(((X_9H^3+X_6)H^3+X_3)H^3+X_0)$$

The pipeline depth and parallel decompositions can be applied together for higher performance, in which case the number of groups is the product of the degree of parallelism and the pipeline depth. For example, if the degree of parallelism is 3 and the pipeline depth is 2, there would be 6 groups:

$$\text{Hash State} = ((X_{17}H^6+X_{11})H^6+X_5)H^5+((X_{16}H^4+X_{10})H^6+X_4)H^4+((X_{15}H^6+X_9)H^6+X_3)H^3+((X_{14}H^6+X_8)H^6+X_2)H^2+((X_{13}H^6+X_7)H^6+X_1)H+((X_{12}H^6+X_6)H^6+X_0)$$

As noted above, it is desirable to be able to support the same processing pipeline being used for multiple different speeds (e.g., 1×100 Gbps, 2×40 Gbps, 10×10 Gbps), and the channel position changing in the pipeline or lane. For example, a single 100 Gbps channel may use four parallel lanes, each with four pipeline stages. A total of 16 groups would be provided. Each lane would feed the same set of four groups. Each group within a lane would have an index differing by four from the index of the previous group, and each lane would have an index differing by one from the index of the previous lane. Each group, which is to be maintained separately, may also be referred to as a partial hash state.

If the location of the end of each packet is not known a priori, additional circuitry may be provided to select the correct sequence of decreasing powers of H to be applied to the last calculation in each group.

Depending on the implementation, the degree of parallelism and the speed of the lane(s) may not be evenly divisible by the channel speed(s). As noted above, this may occur where multiple channel combinations are used, or where a smaller or larger number of lanes is used to save logic, or where the device speed is slower than the channel speed. If the distribution of channels is such that a small number of clock cycles occurs between appearances of a particular channel, higher powers of H may be needed to complete the processing in the available time. While the calculations themselves are not difficult, keeping track of which H value goes with which packet may be complex under these circumstances. This may particularly be an issue where the distribution of channels across the lanes is irregular, such as where a particular channel may not be ready and therefore is skipped in the order of channels in a lane, or where a lane may have no data at all for a given clock cycle.

Figure 11:
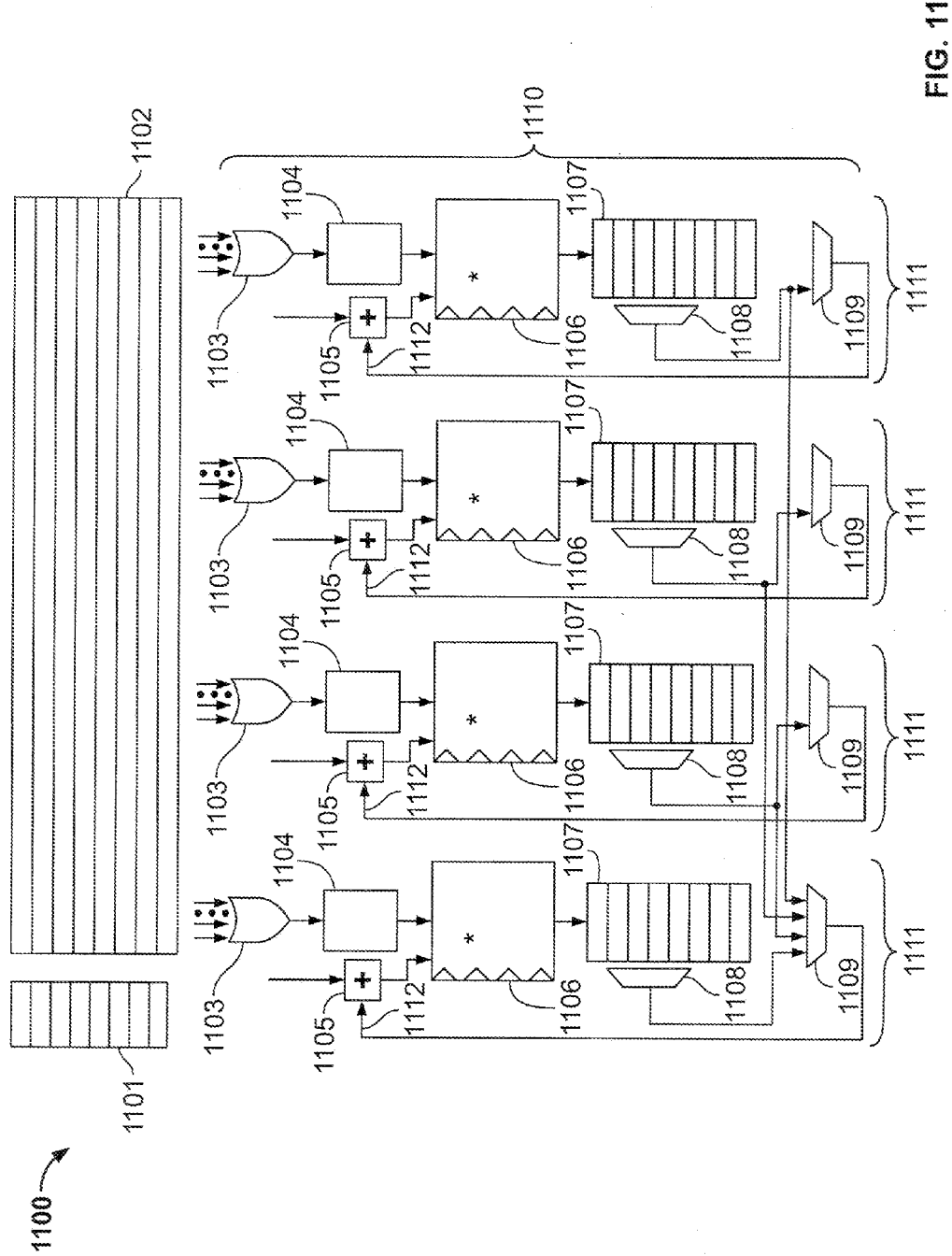
FIG. 11 shows a top level block diagram of an example flexible parallel hash generation circuit according to an embodiment of the invention.

FIG. 11 shows a top level block diagram of an example flexible parallel hash generation circuit 1100 which can keep track of the current values under such conditions. Four lanes and eight channels are shown in this example, although any number of lanes and channels (even as few as one channel) may be provided.

Registers 1101 contain state information for each channel. The primary state information includes the lane number that the next word for that channel is routed to, and the power of H by which that word will be multiplied. Circuitry 1102 determines or tracks the state information for each word for a given channel that may be received at the same time. As described in more detail below, circuitry 1102 may include modules that are replicated on a per-channel basis.

Circuitry 1102 outputs the current partial hash indices and powers of H for each channel to each lane 1111 of authentication circuitry 1110. Only one channel per lane is active at any one time, so while each of OR-gates 1103 (one per lane 1111) receives inputs for all channels, each OR-gate 1103 will inherently output the correct power of H for the current channel for its lane, for storage in a respective one of registers 1104 for that lane.

The current encrypted word for each lane 1111 is input at 1112 to adder 1105, along with the prior value for that lane from multiplexer 1109, and the sum is multiplied in multiplier 1106 (which may be a Galois-field—i.e., finite-field—multiplier) by the power of H from register 1104.

Multiplier 1106 may be pipelined for higher performance. Four pipeline states are shown, but any number of pipeline stages can be used. Pipeline stages may be distributed across the multiplier and into the current hash state multiplexers 1108, 1109 (see below).

Registers 1107 contain the current hash states for the various channels. Each channel will have one or more hash states. The number of separate hash states for each channel is the product of the number of simultaneous hash updates (remember that each channel may appear in more than one lane) for that channel, and the pipeline depth of the hash multiplier and state circuitry (1106, 1108, 1109).

Multiplexers 1108 and 1109 select the current channel hash value for each lane. The required hash value for a given lane may exist in another lane, because the channel in question also is being processed in another lane. Therefore, each multiplexer 1108 selects the current channel from registers 1107 in its own lane, and then each multiplexer 1109 selects from the output of multiplexer 1108 from its own lane and multiplexers 1108 from other lanes. While this arrangement could be fully populated—i.e., so that each multiplexer 1109 could select from the output of all multiplexers 1108—such an arrangement would consume substantial device resources. Therefore, the less-than-fully-populated arrangement shown here, or other such arrangements, can be used in accordance with well known principles, while still allowing most user logic designs to be implemented.

Figure 12:
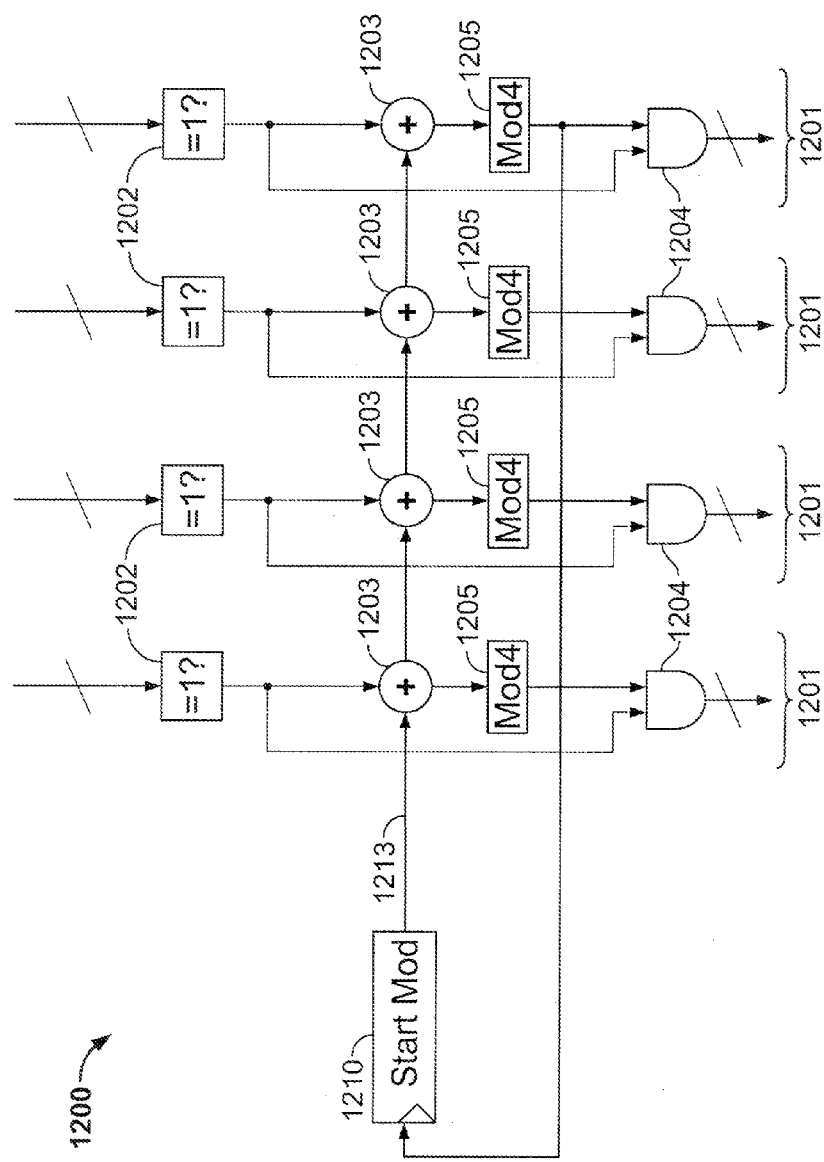
FIG. 12 shows a module for tracking the current partial hash index.

As noted above, circuitry 1102 tracks the current partial hash indices and powers of H. FIG. 12 shows a module 1200, which may be included in circuitry 1102, for tracking the current partial hash index. Module 1200 would be replicated once for each channel that is to be processed in the particular implementation.

In the variant shown in FIG. 12, there are four lanes 1201. For each lane, a comparator 1202 checks whether the channel number on lane 1201 is the channel for which the current module 1200 is checking (in the illustrated module 1200, the channel number is '1', but it could be any channel number supported by the system). If so, a '1' (signifying "affirmative" regardless of channel number) is input into adder 1203, incrementing the previous index that is input at 1213. In case this is not the first pass through circuitry 1200, "start mod" register 1210 stores the last value in the rightmost lane from the previous pass, and is initialized to '0' for the first pass. "Start mod" register 1210 is one of state registers 1101.

The output of comparator 1202 is ANDed at 1204 with the output of adder 1203, so that there is only an output on a particular lane for this channel if the channel is in fact present on the particular lane on the current clock cycle. Modulo unit 1205 is set to the number of partial hash states for the channel, so that the result is not out of bounds. Although there are four lanes and four partial hashes in FIG. 12, there is not necessarily a correlation between the number of lanes and the number of partial hashes. The modulo value in unit 1205 may be adjustable at run time to accommodate the size of the current operation. For example, a single high-speed channel with 4 lanes and 3 pipelines will have 12 partial hashes, while a 6-channel system with 4 lanes and 3 pipelines will have 72 partial hashes, assuming full flexibility in input sequences for multi-channel operation, and a 100% duty cycle.

As noted above, during normal operation, the H-power selected is the highest power used for that channel. However, during the last few word inputs per channel, decreasing powers of H are used. Specifically, a tag optionally can be generated by post-processing the hash—e.g. by adding additional information to it. The hash can in turn be generated from multiple partial hashes. Multiple partial hashes may be generated in parallel because the pipelined hash generation circuitry may not return an updated value for the iterative hash calculation by the time the next hash input arrives. These partial hashes may be generated using, e.g., the same power of a hash key (H).

Figure 13:
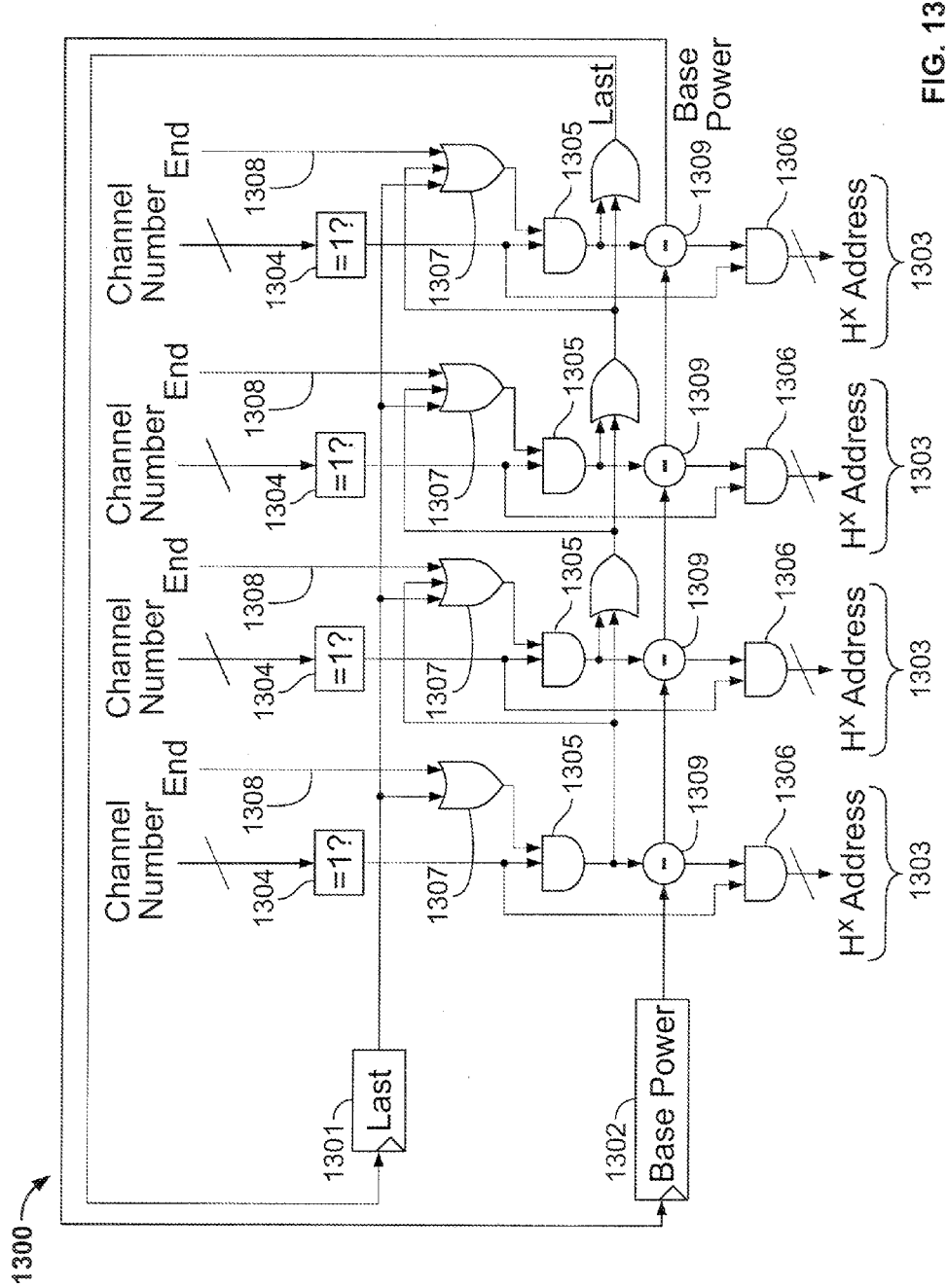
FIG. 13 shows a module to determine when the "wind-down" mode should be active.

When it is time to generate the final hash, the partial hashes are multiplied by decreasing powers of the hash key, and added together. Each partial hash may have an index associated with it, where the index refers to the order of the first calculation into that partial hash. In the case of two partial hashes, their index values may be '0' and '1', or alternatively, they may be designated "odd" and "even". In the case of ten partial hashes, they may be indexed '0' to '9'. The lowest-indexed partial hash may be multiplied with the highest descending power of the hash key. Determining when the begin using the reduced powers is relatively straightforward if the packet length is known a priori. However, if variable length packets are used and words per channel are not always input contiguously, or in fixed slots per lane, this is more of a challenge. Therefore, FIG. 13 shows a module 1300 to determine when the "wind-down" mode should be active.

As in the case of module 1200, there would be one instance of module 1300 for each channel. Again, as drawn, there are 4 lanes, but any number of lanes can be provided. State registers 1101 include "last" register 1301 and "base power" register 1302, whose functions will be described below.

In each lane 1303, comparator 1304 checks whether the channel number on lane 1303 is the channel for which the current module 1300 is checking (in the illustrated module 1300, the channel number is once again '1', but again it could be any channel number supported by the system). If the channel number does not match, AND-gate 1305 and AND-gate 1306 are turned OFF, so that there is no output for that lane for the current channel, but if the channel number does match, AND-gates 1305, 1306 are turned ON. OR-gate 1307 outputs a '1' if either the contents of "last" register 1301 is '1', meaning the current channel already entered the wind-down mode on a previous pass, or if an "end" signal 1308 is received on the current channel. Either way, AND-gate 1305 outputs a '1', which is subtracted at 1309 from the previous power of H. For the leftmost lane 1303, the previous power is the one stored in "base power" register 1302 from the rightmost lane 1303 on the previous pass (register 1302 is initialized to the aforementioned highest power for the channel). The output of each AND-gate 1306 is the current H-power for the current channel in that lane.

Figure 14:
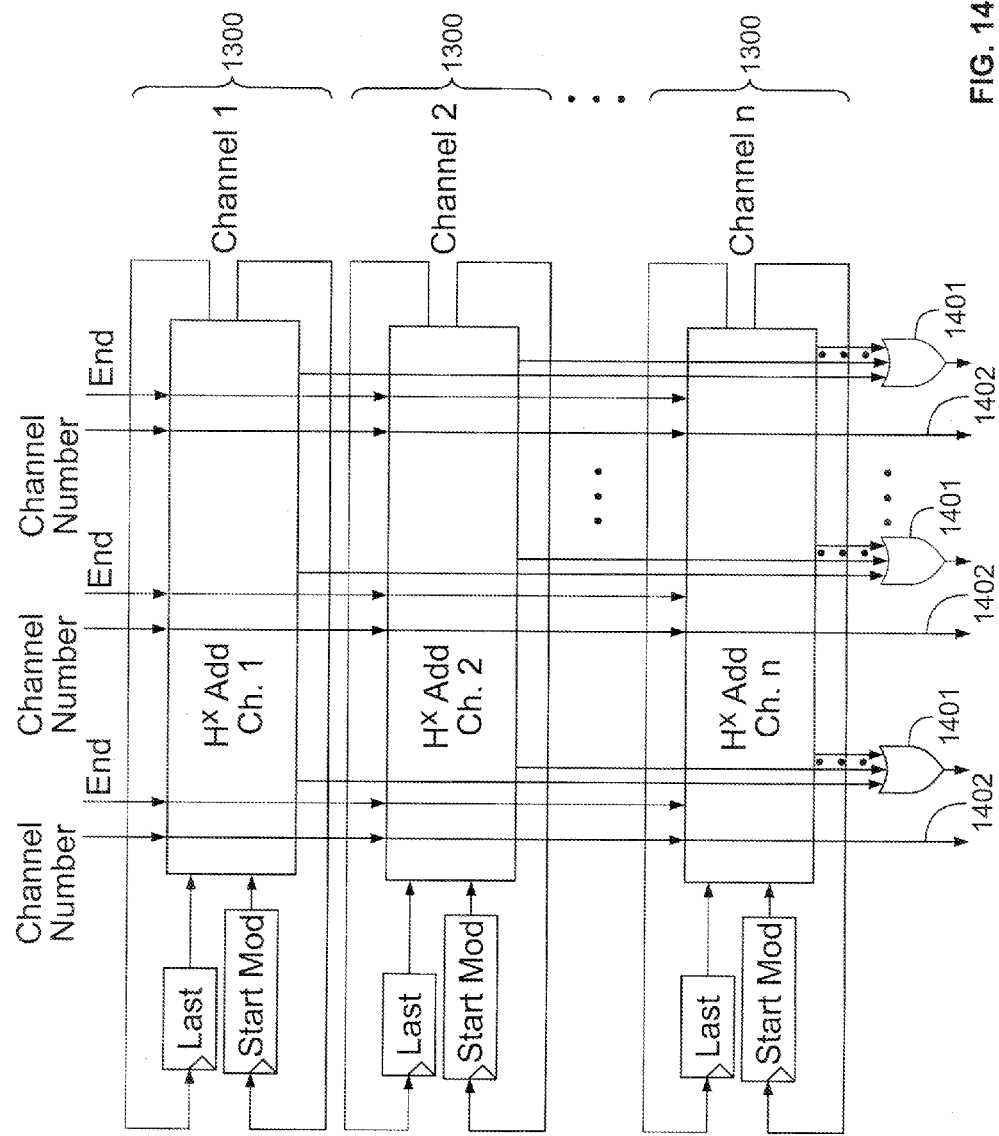
FIG. 14 shows how the outputs of the various modules of FIG. 13 for the various channels may be reduced to one output per lane.

As noted there is a module 1200 for each channel and a module 1300 for each channel. In a programmable device, some maximum number of modules 1200 and modules 1300 may be provided, but not all would be used in a particular user application. Even for a particular user application, or even in a fixed device, the data being processed may not require use of all modules 1200, 1300. Nevertheless, in any implementation, for each lane, there will be one output per channel, even if that output is '0' because that channel is not active on that lane (at most only one channel will be active on any lane, and it is possible that no channel will be active on a particular lane at a particular time). FIG. 14 shows how the outputs of the various modules 1300 for the various channels may be reduced to one output per lane by simply ORing the per-lane outputs over all modules 1300 using one OR-gate 1401 per lane (there will also be a separate channel number output 1402 per lane). A similar arrangement can be used for the outputs of the various modules 1200.

Figure 15:
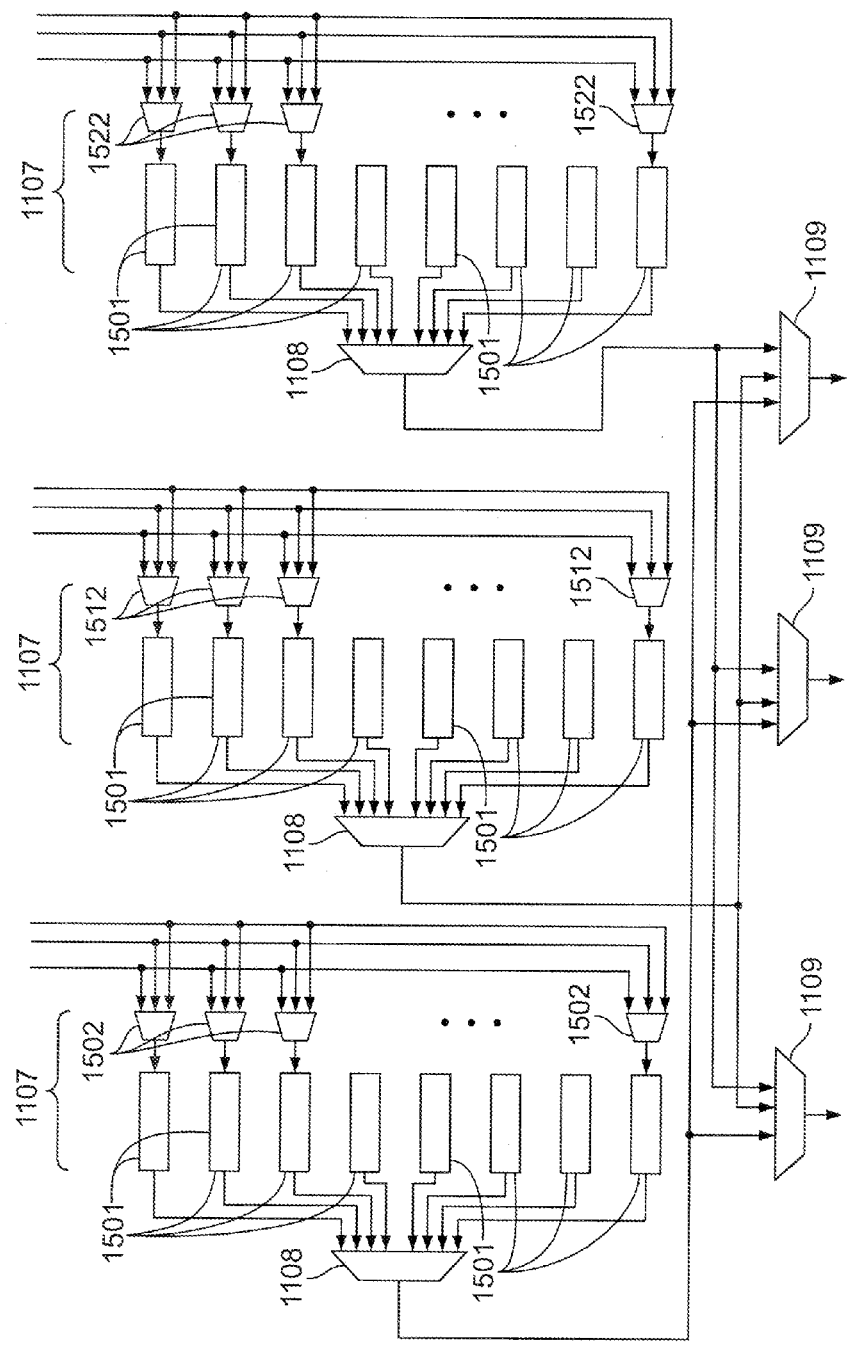
FIG. 15 shows the detail of the output registers of the circuitry of FIG. 11.

FIG. 15 shows the detail of registers 1107 and multiplexers 1108, 1109. In particular registers 1107 include register elements 1501 and lane selection multiplexers 1502, 1512, 1522. The multiplexer selections for lane selection multiplexers 1502, 1512, 1522 as well as output multiplexers 1108, 1109 will depend on the number of lanes, the number of channels, the number of different channel/duty-cycle combinations, etc. The selection patterns can be determined when a design is finalized (e.g., at compile time for a device such as an FPGA), and can be stored in a look-up table.

As explained above, the number of partial hashes equals (the maximum_number_of_channels)×(the number_of_lanes)×(the pipeline_depth)×(the duty cycle). For example, if there are 10 channels, 4 lanes, and a pipeline depth of 5, there would be 200 partial hashes. This is a very large number of partial hashes, requiring a large number of multiplexers out of the partial hash storage. However, if there is a large number of channels, then the duty cycle can most likely be reduced. For example, the average duty cycle may be about 100%/(number of channels)—e.g., for 10 channels, the average duty cycle would be 10% (100%/10 channels), although the peak duty cycle for any given channel may be higher. At a 20% duty cycle, the number of partial hashes would reduce to 40, which is closer to the number for a single high-speed channel (which requires 20 partial hashes).

For any given clock cycle, multiple inputs for any given channel may be received, possibly interspersed with inputs for other channels. In an example case of 3 lanes, channel 1 may receive two input words during the first clock cycle, two input words during the second clock cycle, one input word in the third clock cycle, and then none for six clock cycles. In this case the, average duty cycle is 5/(3×9)=19%, but the peak duty cycle in the first 3 clocks is 5/(3×3)=56%. If the system were designed for a maximum duty cycle in this 10-channel example, there would not be enough partial hash registers. Back pressure can be applied to stop input for any or all channels using an arrangement as shown in FIG. 16, which appears once for each channel.

Figure 16:
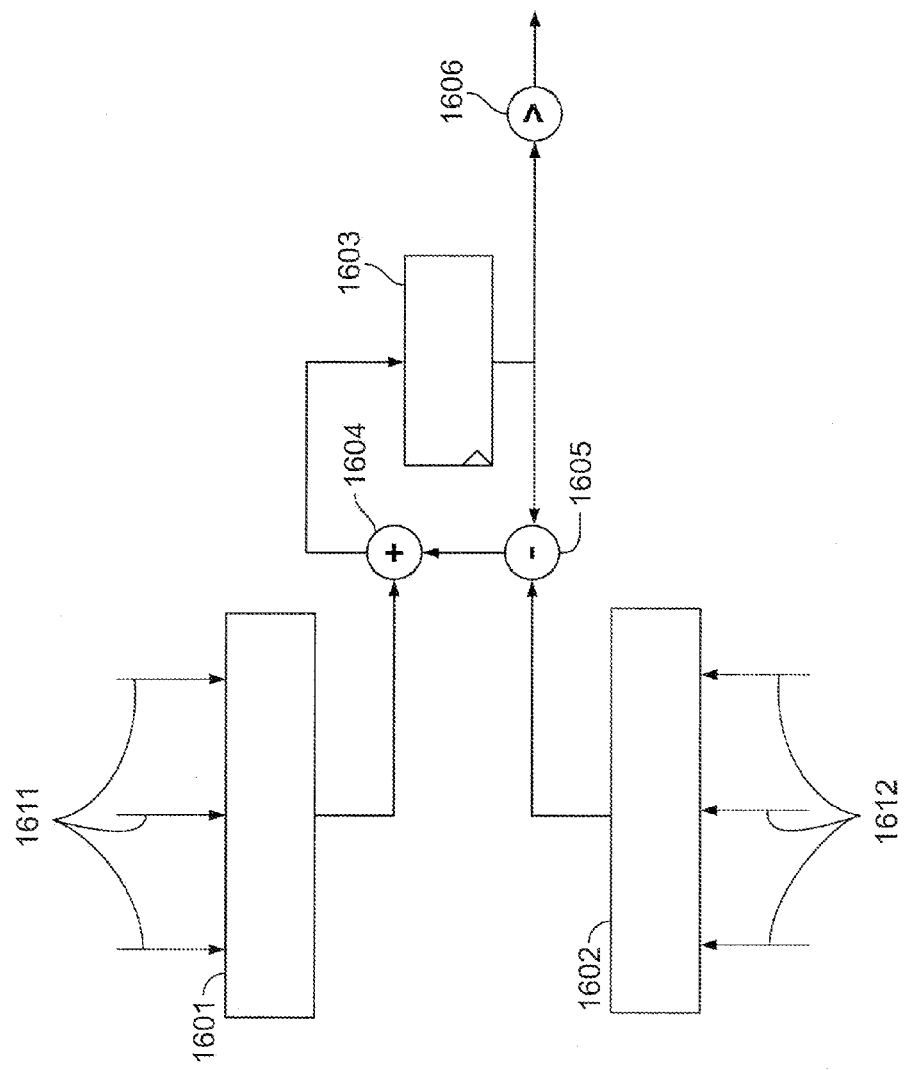
FIG. 16 shows an arrangement for generating stall signals.

As shown in FIG. 16, unary to binary encoder 1601 receives issue pulses 1611 for the channel for each lane. Encoder 1602 receives retire pulses (a partial hash written back to its register) 1612. The binary sum of the number of issues 1611 in any clock is added at 1604 to the current total of outstanding calculations stored at 1603, and the binary sum of the number of retires 1612 is subtracted at 1605 from the running total. The running total is compared at 1606 to the maximum number of outstanding calculations. If the number of outstanding calculations exceeds the maximum, no more inputs are allowed for that channel. This can be handled by a number of methods, such as generating a busy signal for each channel.

Figure 17:
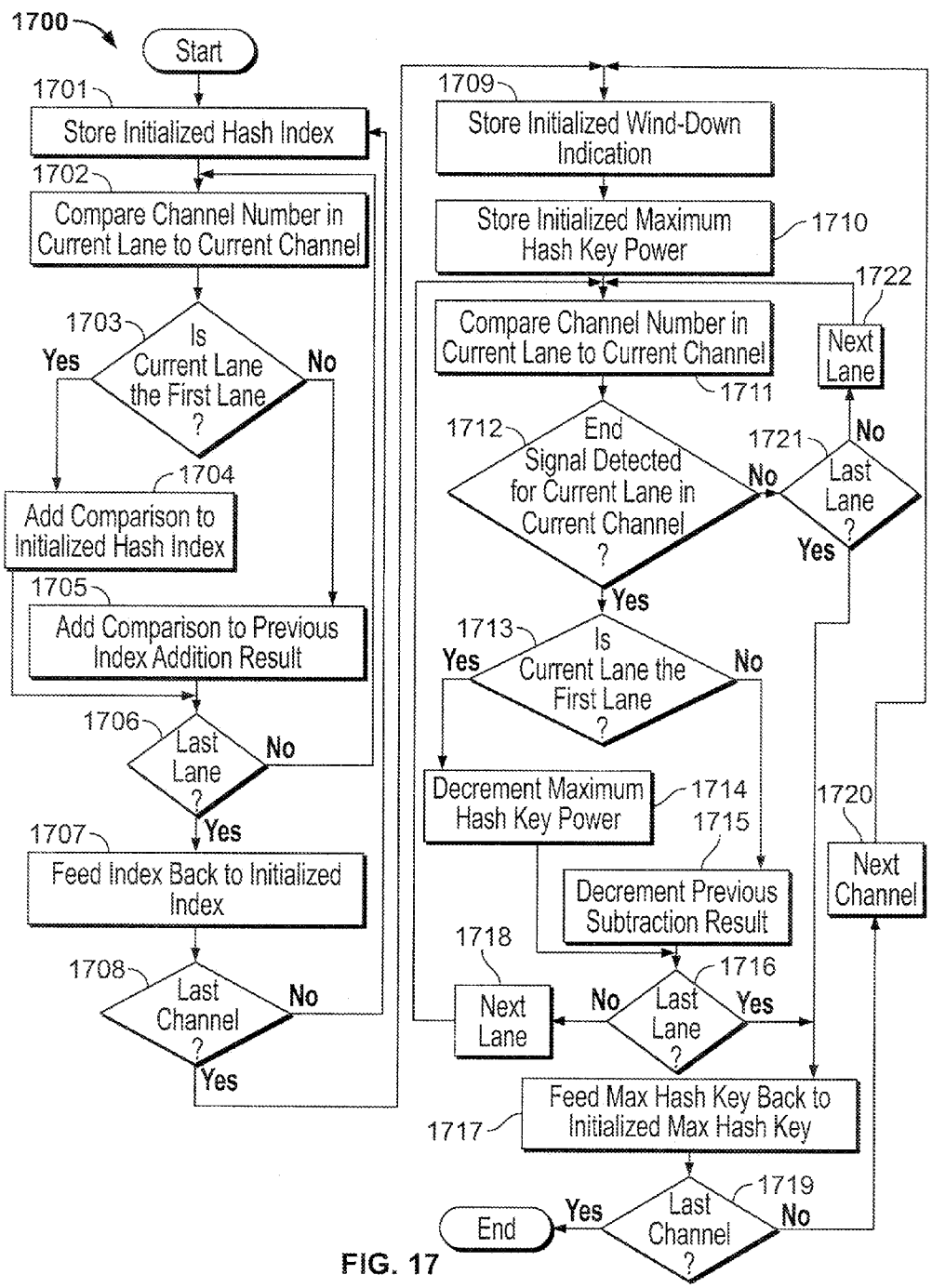
FIG. 17 shows a method of tracking partial hash states according to an embodiment of the invention.

A method 1700 of tracking partial hash states during encryption and authentication of a plurality of channels of data using, e.g., circuitry such as that described above, is diagrammed in FIG. 17. For each channel, a hash index is determined at 1701-1706 by storing an initialized index in memory (the index may be initialized to '0'), as at 1701, and, for each respective lane, comparing a channel number in data in that respective lane to a channel number of that channel, as at 1702, and adding output of the comparison in that respective lane, as at 1703-1705 (1) to the initialized index when said respective lane is a first one of said lanes of said circuitry, as at 1704, or (2) to output of another addition in another one of the lanes when said respective lane is other than a first one of said lanes, as at 1705. At 1706, if there are more lanes, the method returns to 1702, and otherwise proceeds to 1707 where output of the addition in the last lane may be fed back to update the initialized index. At 1708, the method returns to 1701 if there are additional channels, or otherwise continues to 1709.

After the hash index has been determined, method 1700 continues to monitor each channel for the wind-down mode. At 1709, an initialized wind-down indication is stored (the wind-down indication may be initialized to '0'). At 1710, an initialized maximum hash key power is stored (the value to which the maximum hash key power is initialized depends on the particular configuration). For each respective lane, the channel number in incoming data is compared to the channel number of a respective one of the channels as at 1711, and both the respective lane and the stored wind-down indication are tested at 1712 for presence of an "end" signal. On detecting an "end" signal in the respective lane, then if at 1713 the lane is the first lane, the initialized maximum hash key power is decremented at 1714; otherwise the hash key power decremented in a previous lane is further decremented at 1715. At 1716, if the lane is the last lane, the decremented hash key power is fed back at 1717 to update the initialized maximum hash key power; otherwise, at 1718, the method advances to the next lane and returns to 1711.

If after the hash key power is fed back at 1717, then if at 1719 there are no additional channels, the method ends. But if at 1719 there are additional channels, the method advances to the next channel at 1720 and returns to 1709.

If at 1712 no end signal is detected, and at 1721 there are no additional lanes, the method proceeds to 1717 and proceeds as above. If at 1721 there are additional lanes, then at 1722, the method advances to the next lane and returns to 1711.

Thus it is seen that encryption/authentication circuitry, and methods for operating such circuitry, have been provided.

Figure 18:
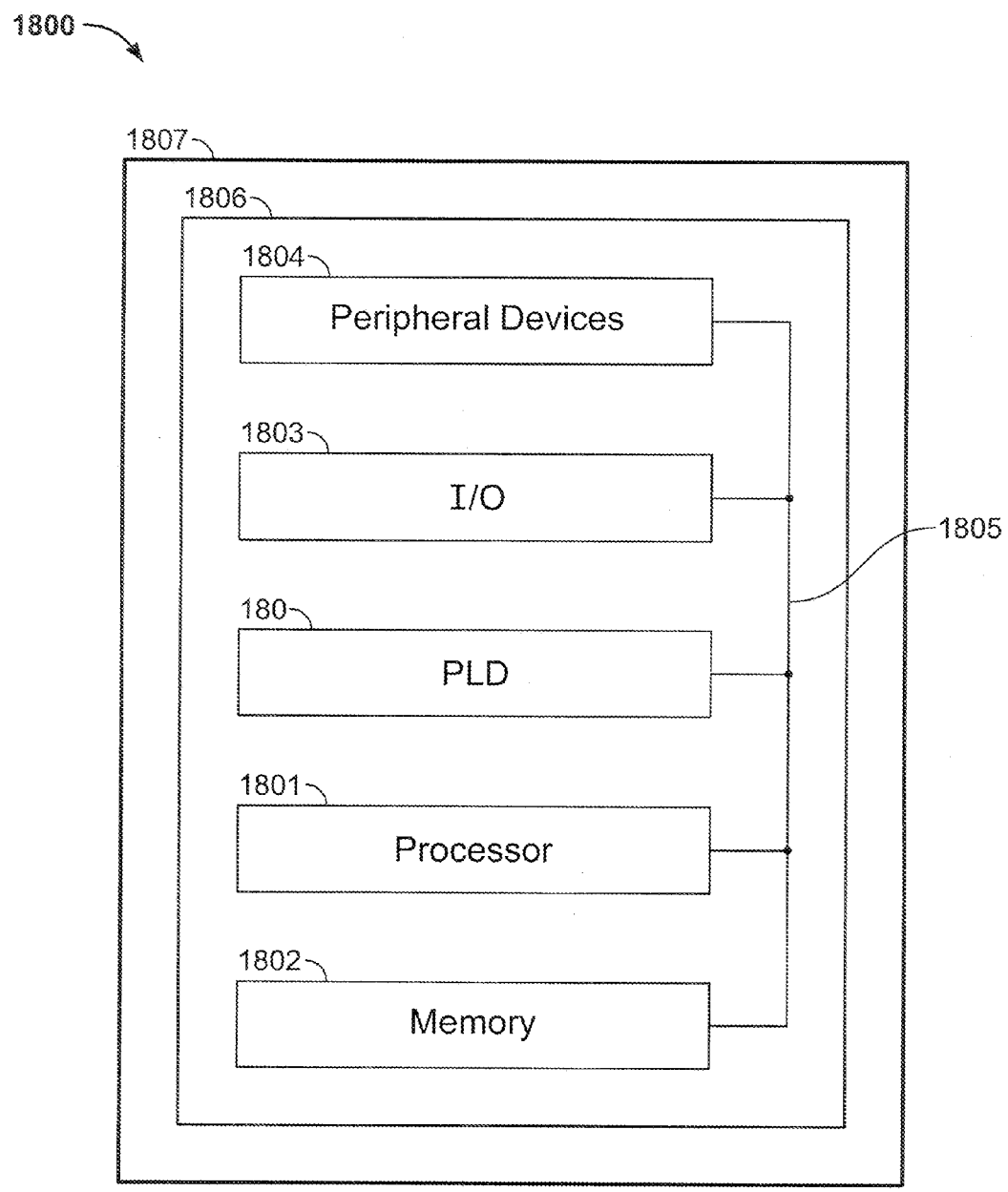
FIG. 18 is a simplified block diagram of an exemplary system employing a programmable logic device incorporating the present invention.

A PLD 180 configured to include encryption/authentication circuitry according to an implementation of the present invention may be used in many kinds of electronic devices. One possible use is in an exemplary data processing system 1800 shown in FIG. 18. Data processing system 1800 may include one or more of the following components: a processor 1801; memory 1102; I/O circuitry 1803; and peripheral devices 1804. These components are coupled together by a system bus 1805 and are populated on a circuit board 1806 which is contained in an end-user system 1807.

System 1800 can be used in a wide variety of applications, such as computer networking, data networking, instrumentation, video processing, digital signal processing, Remote Radio Head (RRH), or any other application where the advantage of using programmable or reprogrammable logic is desirable. PLD 180 can be used to perform a variety of different logic functions. For example, PLD 180 can be configured as a processor or controller that works in cooperation with processor 1801. PLD 180 may also be used as an arbiter for arbitrating access to a shared resources in system 1800. In yet another example, PLD 180 can be configured as an interface between processor 1801 and one of the other components in system 1800. It should be noted that system 1800 is only exemplary, and that the true scope and spirit of the invention should be indicated by the following claims.

Various technologies can be used to implement PLDs 180 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Encryption and authentication circuitry comprising:
    an encryption circuit outputting at least one lane of encrypted data spanning a number of channels; and
    an authentication circuit operating on said at least one lane of encrypted data spanning said number of channels, said authentication circuit including:
    hash constant storage for a predetermined maximum number of channels,
    partial hash selection circuitry for determining, for each respective lane, a respective hash index into said hash constant storage, and
    an adder for adding, to data in said at least one lane of encrypted data, a hash constant selected from said hash constant storage using said respective hash index.

2. The encryption and authentication circuitry of claim 1 wherein:
    said partial hash selection circuitry comprises a plurality of index selection modules; and
    each of said index selection modules corresponds to a respective one of said channels.

3. The encryption and authentication circuitry of claim 2 wherein each of said index selection modules comprises:
    memory for storing an initialized index; and
    for each respective lane:
    a comparator to compare a channel number in data in said respective lane to a channel number of said respective one of said channels, and
    a respective adder for adding output of the comparator in said respective lane (1) to said initialized index when said respective lane is a first one of said lanes, or (2) to output of another of said respective adder in another one of said lanes when said respective lane is other than a first one of said lanes.

4. The encryption and authentication circuitry of claim 3 wherein each of said index selection modules further comprises, for each respective lane, an output AND-gate having as inputs said output of said comparator and output of said respective adder.

5. The encryption and authentication circuitry of claim 3 wherein:
    there is a maximum number of partial hashes; and
    each of said index selection modules further comprises, for each respective lane, a modulo circuit on said output of said respective adder for limiting said output of said respective adder to said maximum number of partial hashes.

6. The encryption and authentication circuitry of claim 3 wherein said maximum number of partial hashes is based on number of channels, number of lanes, and pipeline depth.

7. The encryption and authentication circuitry of claim 4 further comprising a respective output OR-gate for each respective one of said lanes, each respective output OR-gate combining outputs of said output AND-gates for said respective one of said lanes in all of said channels.

8. The encryption and authentication circuitry of claim 3 further comprising a feedback conductor communicating output of said respective adder in a last one of said lanes to said memory for storing said initialized index.

9. The encryption and authentication circuitry of claim 1 wherein:
    said partial hash selection circuitry comprises a plurality of wind-down mode detection modules; and
    each of said wind-down mode detection modules corresponds to a respective one of said channels.

10. The encryption and authentication circuitry of claim 9 wherein each of said wind-down mode detection modules comprises:
    memory for storing an initialized wind-down indication;
    memory for storing an initialized maximum hash key power; and
    for each respective lane:
    a comparator to compare a channel number in data in said respective lane to a channel number of said respective one of said channels, and
    a respective OR-gate for testing said respective lane and said memory for storing an initialized wind-down indication for presence of an "end" signal.

11. The encryption and authentication circuitry of claim 10 wherein at least one said respective OR-gate also tests for presence of said "end" signal in a previous one of said lanes.

12. The encryption and authentication circuitry of claim 11 further comprising, for each respective lane, a respective subtractor for, on indication of an "end" condition, subtracting a constant (1) from said initialized maximum hash key power when said respective lane is a first one of said lanes, or (2) from output of another of said respective subtractor in another one of said lanes when said respective lane is other than a first one of said lanes.

13. The encryption and authentication circuitry of claim 12 further comprising a feedback conductor communicating output of said respective subtractor in a last one of said lanes to said memory for storing said initialized maximum hash key power.

14. The encryption and authentication circuitry of claim 12 wherein each of said wind-down mode detection modules further comprises, for each respective lane, circuitry to output a hash key power for said respective lane based on said output of said comparator and output of said respective subtractor.

15. The encryption and authentication circuitry of claim 10 wherein presence of an "end" condition on one of said channels in any one of said lanes is stored for reference by a future operation on said one of said channels.

16. The encryption and authentication circuitry of claim 15 further comprising a feedback conductor communicating said "last" indication to said memory for storing said wind-down indication.

17. A method of tracking partial hash states during encryption and authentication of a plurality of channels of data using circuitry having at least one authentication lane, said method comprising, for each respective one of said channels, determining a hash index by:
   storing an initialized index in memory in said circuitry; and
   for each respective lane of said circuitry:
   comparing a channel number in data in said respective lane of said circuitry to a channel number of said respective one of said channels, and
   adding output of the comparison in said respective lane of said circuitry (1) to said initialized index when said respective lane is a first one of said lanes of said circuitry, or (2) to output of another of said adding in another one of said lanes of said circuitry when said respective lane is other than a first one of said lanes.

18. The method of claim 17 wherein said storing comprises initializing said index to '0'.

19. The method of claim 18 further comprising feeding back output of said adding in a last one of said lanes to update said initialized index.

20. The method of claim 17 further comprising, for each of said channels, operating a wind-down mode by:
   storing an initialized wind-down indication;
   storing an initialized maximum hash key power; and
   for each respective lane of said circuitry:
   comparing a channel number in data in said respective lane of said circuitry to a channel number of said respective one of said channels, and
   testing said respective lane and said memory for storing an initialized wind-down indication for presence of an "end" signal.

21. The method of claim 20 further comprising feeding back an "end" signal detected in said testing in a last one of said lanes to update said initialized wind-down indication.

22. The method of claim 20 further comprising, for each respective lane:
   on detecting an "end" signal in said respective lane, decrementing (1) said initialized maximum hash key power when said respective lane is a first one of said lanes, or (2) a decremented hash key power from another one of said lanes when said respective lane is other than a first one of said lanes.

23. The method of claim 22 further comprising feeding back a decremented hash key power from a last one of said lanes to update said initialized maximum hash key power.

24. The method of claim 17 wherein said storing an initialized wind-down indication comprises initializing said wind-down indication to '0'.

* * * * *